US012800073B2

(12) United States Patent
Yanagibayashi

(10) Patent No.: US 12,800,073 B2
(45) Date of Patent: Nov. 17, 2026

(54) PIPE CONNECTING STRUCTURE

(71) Applicant: SHIMADZU CORPORATION, Kyoto (JP)

(72) Inventor: Jun Yanagibayashi, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 19/097,294

(22) Filed: Apr. 1, 2025

(65) Prior Publication Data

US 2025/0320939 A1 Oct. 16, 2025

(30) Foreign Application Priority Data

Apr. 15, 2024 (JP) ................................ 2024-065294

(51) Int. Cl.

*F16L 19/07* (2006.01)
*F16L 19/02* (2006.01)
*F16L 21/04* (2006.01)

(52) U.S. Cl.

CPC ........... *F16L 19/07* (2013.01); *F16L 19/0206* (2013.01); *F16L 21/04* (2013.01)

(58) Field of Classification Search

CPC ........ F16L 19/07; F16L 21/04; F16L 19/0206
See application file for complete search history.

(56) References Cited

U.S. PATENT DOCUMENTS 4,619,473 A * 10/1986 Someya ................. B01D 15/08 285/148.13
6,454,314 B1 * 9/2002 Grosspietsch ........ F16L 37/088 285/379
9,134,283 B2 * 9/2015 Hochgraeber .......... F16L 21/04
11,782,032 B2 * 10/2023 Moeller .............. F16L 19/0212 285/189

FOREIGN PATENT DOCUMENTS

JP 2023-067413 A 5/2023

* cited by examiner

*Primary Examiner* — James M Hewitt, II
(74) *Attorney, Agent, or Firm* — Renner, Otto, Boisselle, & Sklar, LLP

(57) ABSTRACT

A pipe connecting structure is configured so that a fluid connection of a pipe to a port is established by insertion of a tip portion of the pipe to a predetermined position in the port. The pipe connecting structure includes a pressing structure that is in contact with an outer peripheral surface of the tip portion of the pipe inserted to the predetermined position of the port and generates pressing force toward a center of the port on the outer peripheral surface of the tip portion of the pipe. Further, the pipe connecting structure is configured so that a center of the tip portion of the pipe and a center of the port substantially coincide with each other by pressing force generated by the pressing structure when the tip portion of the pipe is inserted to the predetermined position of the port.

4 Claims, 7 Drawing Sheets

PIPE CONNECTING STRUCTURE

BACKGROUND OF THE INVENTION

1. Field of the Invention

The present invention relates to a pipe connecting structure for establishing a fluid connection of a pipe to a port.

2. Description of the Related Art

A liquid chromatograph (hereinafter, LC) generally includes a liquid feeding pump, an autosampler, a separation column, and a detector. Each module is connected by a pipe. By the above, a sample to be analyzed injected by the autosampler joins a mobile phase fed by the liquid feeding pump, components in the sample are separated from each other by the separation column, and the separated components are sequentially detected by the detector (see, for example, Patent Literature 1).

PRIOR ART DOCUMENT

Patent Literature

Patent Literature 1: JP 2023-067413 A

SUMMARY OF THE INVENTION

In an LC, accuracy of a mobile phase flow rate is important because a flow rate of a mobile phase affects an analysis result. In particular, in a nano-micro LC in which a diameter of a flow path is less than 100 μm and a minimum diameter is about 10 to 20 μm, an analysis result is greatly affected even if there is slight deviation or leakage at a connection portion of a flow path, and for this reason, flow path connection needs to be established with high accuracy.

In view of the above, an object of the present invention is to provide a pipe connecting structure in which flow path connection can be established with high accuracy.

In a general pipe connecting structure in which a pipe is connected to a port using a ferrule and a nut, an inner diameter at a predetermined position in the port is slightly larger than an outer diameter of a tip portion of the pipe in order to enable insertion and removal of the tip portion of the pipe with respect to the port, and a gap exists between an inner surface at a predetermined position in the port and an outer peripheral surface of the tip portion of the pipe. For this reason, a pipe may be fixed to a port in a state where the center of a tip portion of the pipe is misaligned with respect to the center of the port. If the center of a tip portion of a pipe is misaligned with respect to the center of a port, an internal flow path of the pipe is misaligned with respect to an internal flow path of the port, and flow of fluid in the port may be hindered. In view of the above, in a first embodiment of the pipe connecting structure according to the present invention, a pressing structure that generates pressing force so that the center of a tip portion of a pipe approaches the center of a port is provided at a connection portion of the pipe with respect to the port.

That is, a first embodiment of a pipe connecting structure according to the present invention is a pipe connecting structure in which a fluid connection of a pipe to a port is established by insertion of a tip portion of the pipe to a predetermined position in the port, the pipe connecting structure including:

a pressing structure that is in contact with an outer peripheral surface of the tip portion of the pipe inserted to the predetermined position of the port and generates pressing force toward a center of the port on the outer peripheral surface of the tip portion of the pipe, in which the pipe connecting structure is configured so that a center of the tip portion of the pipe and the center of the port substantially coincide with each other by pressing force generated by the pressing structure when the tip portion of the pipe is inserted to the predetermined position of the port.

Further, as a structure for connecting a pipe to a port, in addition to a structure in which a ferrule is attached to a tip portion of the pipe and the ferrule is pressed against the port to maintain liquid-tightness of a flow path connection portion, there is a structure in which a seal member made from an elastic material is attached to a tip surface of the pipe and the seal member is pressed against an innermost surface of the port to maintain liquid-tightness of the flow path connection portion. In these structures, there is a risk that the ferrule or the seal member comes into contact with another structure and is damaged when the pipe is removed from the port. Damage to the ferrule or the seal member may cause problems such as a decrease in sealing performance at the flow path connection portion and retention of a sample at the time of analysis. In view of the above, in a second embodiment of the pipe connecting structure according to the present invention, a seal member for maintaining liquid-tightness of a flow path connection portion when a pipe is connected to a port is provided not at a tip of the pipe but inside the port.

That is, the second embodiment of the pipe connecting structure according to the present invention is a pipe connecting structure in which a fluid connection of a pipe to a port is established by insertion of a tip portion of the pipe to a predetermined position in the port, and an innermost surface of the port and a tip surface of the pipe are flat surfaces, the pipe connecting structure including a seal member having an annular shape made from an elastic material held on the innermost surface of the port, in which the seal member is configured to be sandwiched between the innermost surface of the port and the tip surface of the pipe when the tip portion of the pipe is inserted to the predetermined position of the port, so that a fluid connection is liquid-tightly established between internal flow paths of the pipe and the port.

According to the first embodiment of the pipe connecting structure according to the present invention, a pressing structure that is in contact with an outer peripheral surface of a tip portion of a pipe inserted to a predetermined position of a port and generates pressing force toward the center of the port on the outer peripheral surface of the tip portion of the pipe is included, and the pipe connecting structure is configured so that the center of the tip portion of the pipe and the center of the port substantially coincide with each other by pressing force generated by the pressing structure when the tip portion of the pipe is inserted to the predetermined position of the port, and therefore, misalignment between the center of the tip portion of the pipe and the center of the port is suppressed. By this, a pipe connecting structure capable of performing flow path connection with high accuracy is provided.

According to the second embodiment of the pipe connecting structure according to the present invention, an innermost surface of the port and a tip surface of the pipe are flat surfaces, a seal member having an annular shape made from an elastic material held on the innermost surface of the port is included, and is configured to be sandwiched between the innermost surface of the port and the tip surface of the pipe when the tip portion of the pipe is inserted to the predetermined position of the port, so that a fluid connection is liquid-tightly established between internal flow paths of the pipe and the port, and therefore, the seal member is prevented from being damaged when the pipe is removed from the port. By this, a pipe connecting structure capable of performing flow path connection with high accuracy is provided.

DETAILED DESCRIPTION OF THE INVENTION

Figure 1:
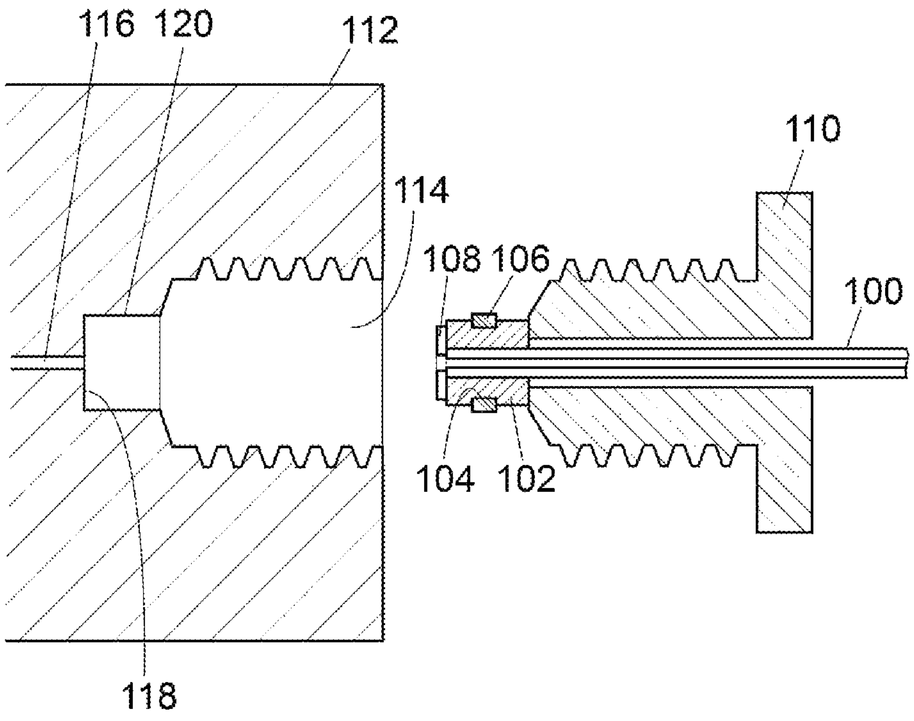
FIG. 1 is a cross-sectional view illustrating a first embodiment of a pipe connecting structure.

Hereinafter, an embodiment of the pipe connecting structure according to the present invention will be described with reference to the drawings.

A first embodiment of the pipe connecting structure will be described with reference to FIG. 1.

The pipe connecting structure of this embodiment is a structure in which a pipe 100 is connected to a port 114 provided in a flow path block 112.

The pipe 100 passes through the inside of a nut 110, and a sleeve 102 is attached to a tip portion of the pipe 100. A position of the sleeve 102 is adjusted such that its tip surface is aligned with a tip surface of the pipe 100. An inner diameter of the nut 110 is smaller than an outer diameter of the sleeve 102. A groove 104 is provided in a circumferential direction on an outer peripheral surface of the sleeve 102, and an elastic member 106 having an annular shape is fitted into the groove 104. A seal member 108 having an annular shape made from an elastic material is attached to a tip surface of the sleeve 102 and the pipe 100.

The seal member 108 may have an elastic modulus smaller than an elastic modulus of a tip surface of the pipe 100, a tip surface of the sleeve 102, and an innermost surface 118 of the port 114. For example, a tip surface of the pipe 100, a tip surface of the sleeve 102, and the innermost surface 118 of the port 114 can be made from metal or ceramic, and the seal member 108 can be made from resin.

An outer diameter of the sleeve 102 is slightly smaller than an inner diameter of an innermost portion 120 of the port 114, and an outer diameter of the elastic member 106 is slightly larger than the inner diameter of the innermost portion 120 of the port 114. The sleeve 102 is made from resin or metal, and the elastic member 106 is made from resin having elasticity, such as polyether ether ketone (PEEK).

The elastic member 106 constitutes a pressing structure that presses a tip portion of the pipe 100 in a direction to the center of the innermost portion 120 of the port 114 when the tip portion of the pipe 100 to which the sleeve 102 is attached is inserted to the innermost portion 120 of the port 114. That is, when the tip portion of the pipe 100 is inserted to the innermost portion 120 of the port 114, the elastic member 106 comes into contact with an inner peripheral surface of the innermost portion 120 and is elastically compressed and deformed, and generates elastic force to press the sleeve 102 in a direction toward the center of the innermost portion 120 of the port 114, and by this, the tip portion of the pipe 100 is pressed in a direction toward the center of the innermost portion 120 of the port 114.

An end portion of a flow path 116 to which a fluid connection of the pipe 100 is to be established faces a center portion of the innermost surface 118 of the port 114. The fluid connection of the pipe 100 to the flow path 116 is established by fastening the nut 110 to the port 114 and pressing the seal member 108 on a tip surface of the sleeve 102 and the pipe 100 against an innermost surface of the port 114. At this time, a tip portion of the pipe 100 is aligned with the center of the innermost portion 120 of the port 114 by elastic force of the elastic member 106, so that a central axis of the tip portion of the pipe 100 substantially coincides with a central axis of an end surface of the flow path 116 facing the innermost surface 118 of the port 114, and a fluid connection of an internal flow path of the pipe 100 to the flow path 116 is accurately established.

A second embodiment of the pipe connecting structure will be described with reference to FIG. 2.

The second embodiment has a structure in which a pipe 200 is connected to a port 210 provided in a flow path block 208.

The pipe 200 passes through the inside of a nut 206, and a sleeve 202 is attached to a tip portion of the pipe 200. A position of the sleeve 202 is adjusted such that its tip surface is aligned with a tip surface of the pipe 200. An inner diameter of the nut 206 is smaller than an outer diameter of the sleeve 202. A seal member 204 having an annular shape made from an elastic material is attached to a tip surface of the sleeve 202 and the pipe 200. An outer diameter of the sleeve 202 is slightly smaller than an inner diameter of an innermost portion of the port 210. The sleeve 202 is made from resin or metal.

The seal member 204 may have an elastic modulus smaller than an elastic modulus of a tip surface of the pipe 200, a tip surface of the sleeve 202, and an innermost surface 214 of the port 210. For example, a tip surface of the pipe 200, a tip surface of the sleeve 202, and the innermost surface 214 of the port 210 can be made from metal or ceramic, and the seal member 204 can be made from resin.

A groove 217 is provided in a circumferential direction on an inner peripheral surface of an innermost portion 216 of the port 210, and an elastic member 218 having a substantially cylindrical shape is fitted into the groove 217. An inner diameter of the elastic member 218 is slightly smaller than an outer diameter of the sleeve 202 attached to a tip portion of the pipe 200. The elastic member 218 is made from, for example, resin having elasticity such as PEEK.

The elastic member 218 constitutes a pressing structure that presses a tip portion of the pipe 200 in a direction to the center of the innermost portion 216 of the port 210 when the tip portion of the pipe 200 to which the sleeve 202 is attached is inserted to the innermost portion 216 of the port 210. That is, when the tip portion of the pipe 200 is inserted to the innermost portion 216 of the port 210, the elastic member 218 comes into contact with an outer peripheral surface of the sleeve 202 and is elastically compressed and deformed, and generates elastic force to press the sleeve 202 in a direction toward the center of the innermost portion 216 of the port 210, and by this, the tip portion of the pipe 200 is pressed in a direction toward the center of the innermost portion 216 of the port 210. An edge 220 on the inner side on the opening side (right side in the diagram) of the port 210 of the elastic member 218 has a tapered shape, and the sleeve 202 is smoothly guided to the inner side of the elastic member 218 when a tip portion of the pipe 200 is inserted toward the innermost surface 216 of the port 210.

An end portion of a flow path 212 to which a fluid connection of the pipe 200 is to be established faces a center portion of the innermost surface 214 of the port 210. The fluid connection of the pipe 200 to the flow path 212 is established by fastening the nut 206 to the port 210 and pressing the seal member 204 on a tip surface of the sleeve 202 and the pipe 200 against the innermost surface 214 of the port 210. At this time, a tip portion of the pipe 200 is aligned with the center of the innermost portion 216 of the port 210 by elastic force of the elastic member 218, so that a central axis of the tip portion of the pipe 200 substantially coincides with a central axis of an end surface of the flow path 212 facing the innermost surface 214 of the port 210, and a fluid connection of an internal flow path of the pipe 200 to the flow path 212 is accurately established.

Figure 3:
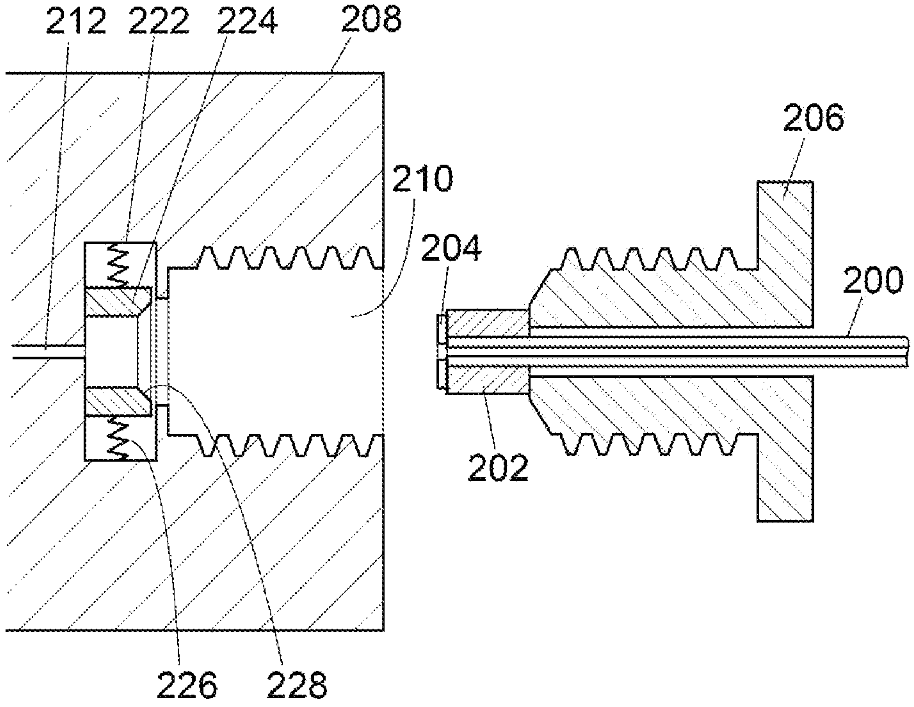
FIG. 3 is a cross-sectional view illustrating a third embodiment of the pipe connecting structure.
Figure 4:
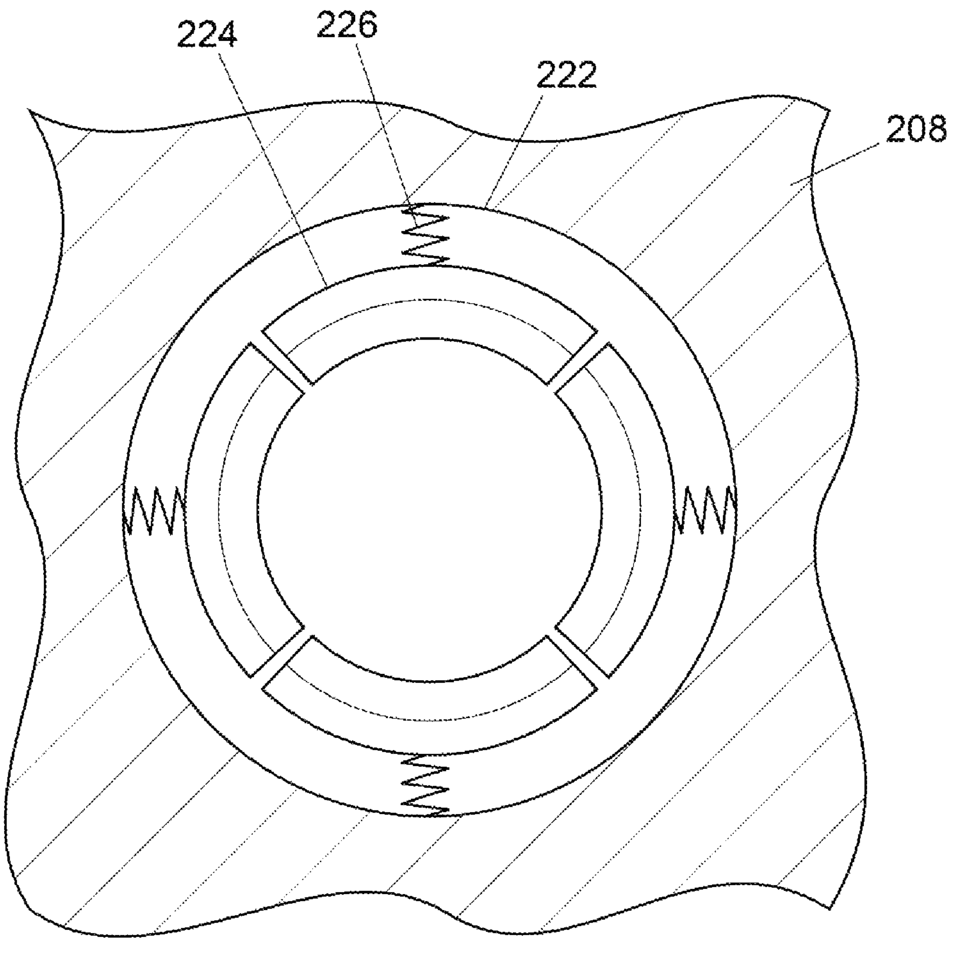
FIG. 4 is a plan view of a pressing structure portion of the third embodiment.

A third embodiment of the pipe connecting structure will be described with reference to FIGS. 3 and 4.

The third embodiment is the same as the second embodiment in that a pressing structure is provided at an innermost portion of the port 210, but, in the third embodiment, the pressing structure is realized by a movable wall surface 224 and an elastic body 226 instead of the elastic member 216 of the second embodiment.

A cavity 222 having a cylindrical shape is provided at an innermost portion of the port 210 of the flow path block 208, four of the movable wall surfaces 224 are arranged inside the cavity 222, and the elastic body 226 is interposed between an inner peripheral surface of the cavity 222 and each of the movable wall surfaces 224. Four of the movable wall surfaces 224 form an inner wall surface of an innermost portion of the port 210. Each of the elastic bodies 226 is a coil spring or the like that is elastically deformed in a radial direction of the cavity 222. The movable wall surface 224 can move in the radial direction of the cavity 222 by the elastic body 226 elastically deforming, and by this, an inner diameter of an innermost portion of the port 210 elastically changes.

An inner diameter of an innermost portion of the port 210 is designed to be slightly smaller than an outer diameter of the sleeve 202 attached to a tip portion of the pipe 200 when the elastic body 226 is in a natural state in which the elastic body 226 is not elastically deformed. An edge 228 on the inner side on the opening side of the port 210 of the movable wall surface 224 has a tapered shape, and when a tip of the pipe 200 is inserted toward an innermost surface of the port 210, the sleeve 202 comes into contact with the edge 228 having a tapered shape of the movable wall surface 224, so that the movable wall surface 224 is pressed in a radially outward direction and an inner peripheral surface of the movable wall surface 224 is expanded following an outer peripheral surface of the sleeve 202. When the movable wall surface 224 is expanded in the radially outward direction, the elastic body 226 is elastically compressed to generate elastic force in a radially inward direction. The elastic force of the elastic body 226 uniformly presses the sleeve 202 in a radially inward direction, and by this, a tip portion of the pipe 200 is aligned with the center of an innermost portion of the port 210.

Note that, in the third embodiment above, a wall surface of an innermost portion of the port 210 is constituted by four of the movable wall surfaces 224, but the present invention is not limited to this, and only needs to be configured to include one or more movable wall surfaces and to be able to elastically change an inner diameter of the innermost portion.

Figure 5:
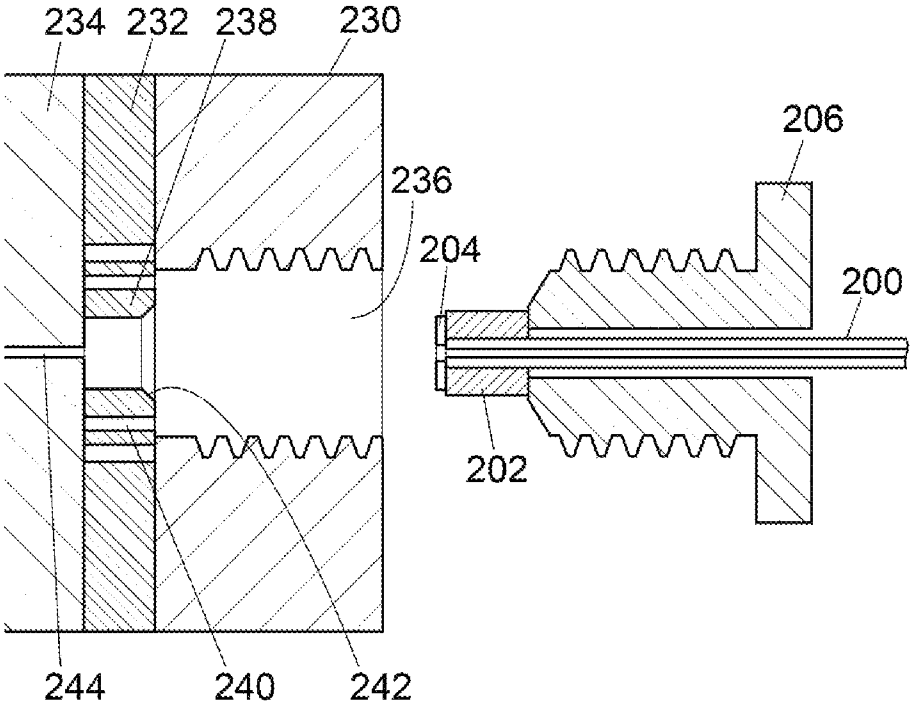
FIG. 5 is a cross-sectional view illustrating a fourth embodiment of the pipe connecting structure.
Figure 6:
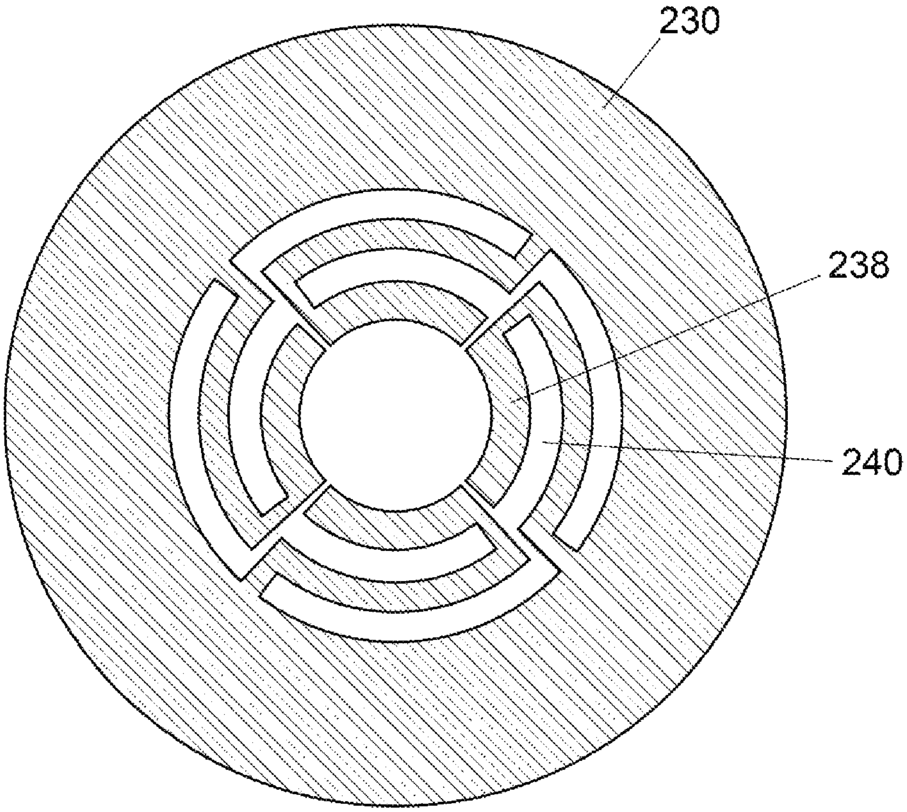
FIG. 6 is a plan view of the pressing structure portion of the fourth embodiment.

A fourth embodiment of the pipe connecting structure will be described with reference to FIGS. 5 and 6.

The fourth embodiment is similar to the second and third embodiments in that a pressing structure is provided at an innermost portion of a port 236. In the fourth embodiment, three blocks 230, 232, and 234 are stacked on top of each other to form the port 236 and a flow path 244 to which the pipe 200 is to be connected. The pressing structure at an innermost portion of the port 236 is formed by the block 232 sandwiched between the blocks 230 and 234.

In the block 232, four movable wall surfaces 238 at a central portion forming an inner wall surface at an innermost portion of the port 236 are formed. A cavity portion 240 is formed in an outer peripheral portion of the movable wall surface 238 of the block 232, and the movable wall surface 238 is elastically moved to the outer side in the radial direction as force is applied from the inner side to the movable wall surface 238. An inner diameter of an opening having a circular shape formed on the inner side of four of the movable wall surfaces 238 is slightly smaller than an outer diameter of the sleeve 202 attached to a tip portion of the pipe 200. An edge 242 on the inner side on the opening side of the port 236 of the movable wall surface 238 has a tapered shape, and when a tip of the pipe 200 is inserted toward an innermost surface of the port 210, the sleeve 202 comes into contact with the edge 242 having a tapered shape of the movable wall surface 238, so that the movable wall surface 238 is pressed in a radially outward direction and an inner peripheral surface of the movable wall surface 238 is expanded following an outer peripheral surface of the sleeve 202. When the movable wall surface 238 is expanded in a radially outward direction, elastic force in a radially inward direction acts on the movable wall surface 238, and the sleeve 202 is uniformly pressed in a radially inward direction, and by this, a tip portion of the pipe 200 is aligned with the center of an innermost portion of the port 236.

Note that, although the first to fourth embodiments described above have a structure in which a fluid connection of a pipe to a flow path provided in a flow path block, the present invention is not limited to this, and can be similarly applied to a pipe connecting structure in which a fluid connection is established by causing two pipes to abut against each other.

An embodiment of a pipe connecting structure for a fluid connection established by causing two pipes to abut against each other will be described with reference to FIGS. 7 and 8.

Figure 7:
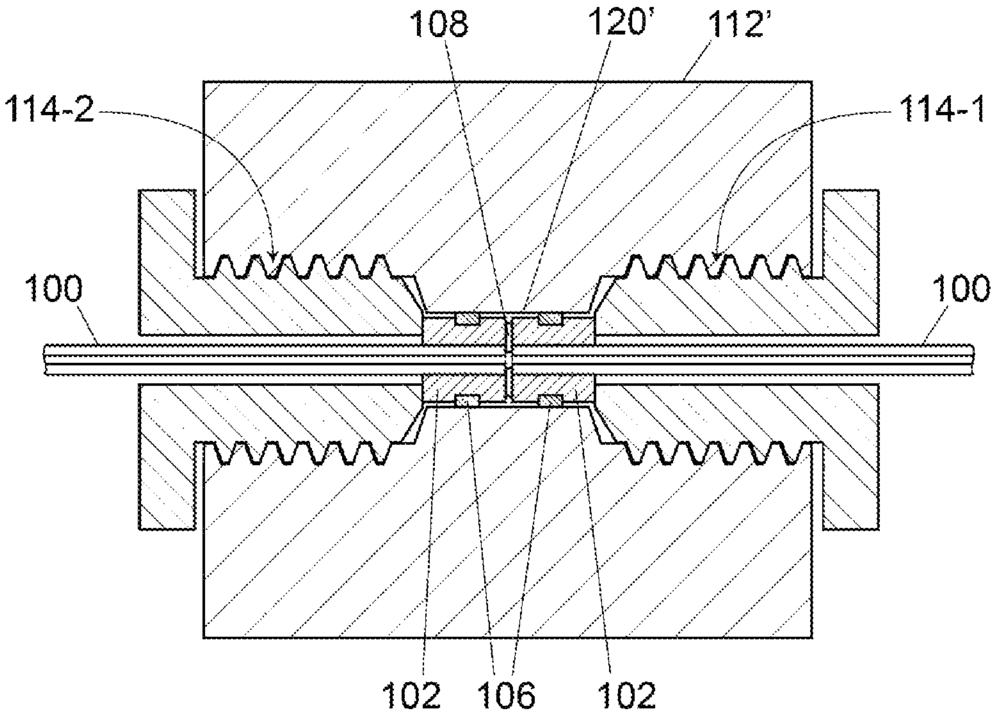
FIG. 7 is a cross-sectional view illustrating a variation of the first embodiment.

The embodiment of FIG. 7 is a variation of the first embodiment (see FIG. 1).

In the variation of FIG. 7, ports 114-1 and 114-2 are provided on two surfaces facing opposite sides to each other of a block 112', innermost portions 120' of the ports 114-1 and 114-2 are connected, and tip surfaces of two of the pipes 100 abut against each other in the innermost portion 120'. An inner diameter of the innermost portion 120' is larger than an outer diameter of the sleeve 102 attached to a tip portion of the pipe 100 and smaller than an outer diameter of the elastic member 106 provided on an outer periphery of the sleeve 102.

When a tip portion of the pipe 100 is inserted from each of the ports 114-1 and 114-2 and reaches the innermost portion 120', the tip portion of each of the pipes 100 is aligned with the center of the innermost portion 120' by elastic force of the elastic member 106 provided on an outer periphery of the sleeve 102. By this, the centers of the tip portions of the pipes 100 inserted from the ports 114-1 and 114-2 and abutting against each other substantially coincide with each other. Sealability between two of the pipes 100 abutting against each other is maintained by the seal member 108 provided on a tip surface of one or both of the pipes 100 being sandwiched between tip surfaces of the pipes 100.

Figure 2:
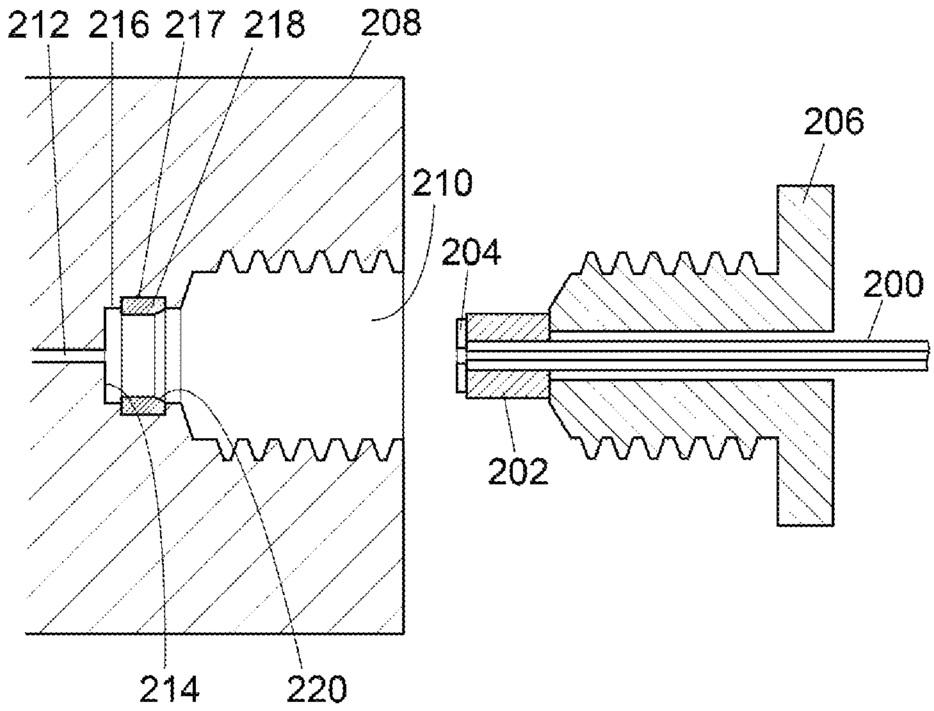
FIG. 2 is a cross-sectional view illustrating a second embodiment of the pipe connecting structure.
Figure 8:
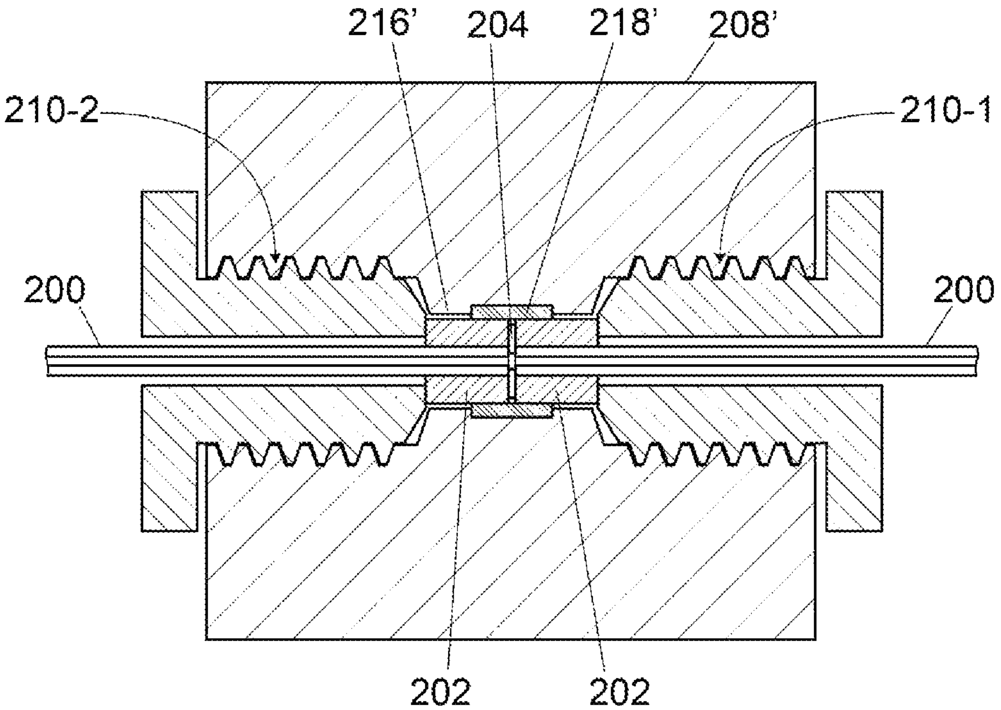
FIG. 8 is a cross-sectional view illustrating a variation of the second embodiment.

The embodiment of FIG. 8 is a variation of the second embodiment (see FIG. 2).

In the variation of FIG. 7, ports 210-1 and 210-2 are provided on two surfaces facing opposite sides to each other of a block 208', innermost portions 216' of the ports 210-1 and 210-2 are connected, and tip surfaces of two of the pipes 200 abut against each other in the innermost portion 216'. An elastic member 218' having a hollow cylindrical shape is provided in the innermost portion 216'. An inner diameter of the innermost portion 216' is larger than an outer diameter of the sleeve 202 attached to a tip portion of the pipe 200, and an inner diameter of the elastic member 218' is slightly smaller than an outer diameter of the sleeve 202.

When a tip portion of the pipe 200 is inserted from each of the ports 210-1 and 210-2 and reaches the innermost portion 216', the tip portion of each of the pipes 200 is aligned with the center of the innermost portion 216' by elastic force of the elastic member 218' provided in the innermost portion 216'. By this, the centers of the tip portions of the pipes 200 inserted from the ports 210-1 and 210-2 and abutting against each other substantially coincide with each other. Sealability between two of the pipes 200 abutting against each other is maintained by the seal member 204 provided on a tip surface of one or both of the pipes 200 being sandwiched between tip surfaces of the pipes 200.

Note that although FIGS. 7 and 8 are variations of the first and second embodiments, the pressing structure of the third and fourth embodiments can be similarly applied to a pipe connecting structure in which two pipes abut against each other.

Figure 9:
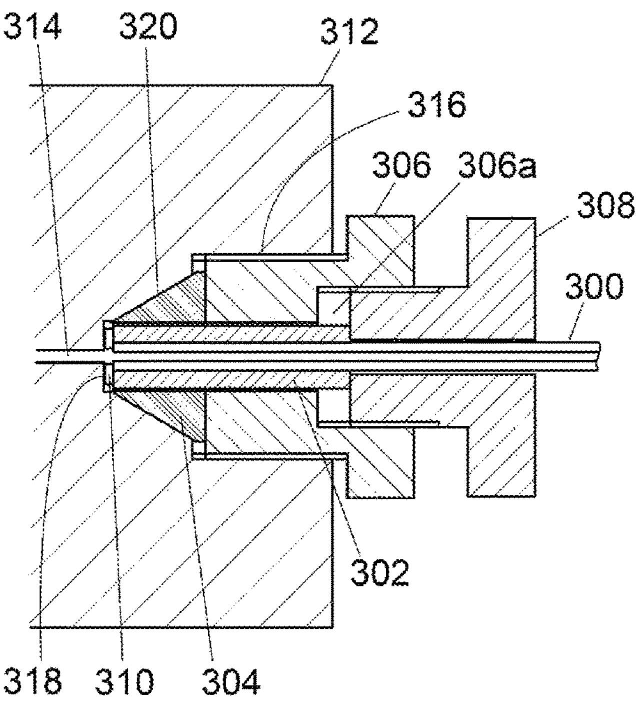
FIG. 9 is a cross-sectional view illustrating a fifth embodiment of the pipe connecting structure.

Next, a fifth embodiment of the pipe connecting structure will be described with reference to FIG. 9.

The pipe connecting structure of this embodiment is a structure in which a pipe 300 is connected to a port 316 provided in a flow path block 312.

A sleeve 302 is attached to a tip portion of the pipe 300 in a state where the pipe 300 passes through the inside of a second nut 308. An inner diameter of the second nut is slightly larger than an outer diameter of the pipe 300 and smaller than an outer diameter of the sleeve 302. A position of the sleeve 302 is adjusted such that a tip surface is aligned with a tip surface of the pipe 300. A seal member 310 having an annular shape made from an elastic material is attached to a tip surface of the sleeve 302 and the pipe 300.

Furthermore, a tip portion of the pipe 300 passes through the inside of an alignment ferrule 304 and a first nut 306. An inner diameter of the alignment ferrule 304 is slightly larger than an outer diameter of the sleeve 302 to such an extent that the sleeve 302 can be inserted inside the alignment ferrule 304. An inner diameter of the first nut 306 is slightly larger than an outer diameter of the sleeve 302. A recess **306*a* having a cylindrical shape is provided on a back surface (a surface on the right side in the diagram) of the first nut 306, and a screw screwed with a screw of the second nut 308** is provided on its inner peripheral surface.

An outer peripheral surface of the alignment ferrule 304 is inclined such that an outer diameter decreases toward the tip side of the pipe 300. An inner peripheral surface of an innermost portion 320 of the port 316 is inclined at an angle corresponding to an outer peripheral surface of the alignment ferrule 304.

When the pipe 300 is fixed to the port 316, the first nut 306 is fastened to the port 316, so that a tip portion of the pipe 300 is aligned with the center of the innermost surface 320 by a relationship between an outer peripheral surface of the alignment ferrule 304 and an inner peripheral surface of the innermost surface 320 of the port 316. After the above, by fastening of the second nut 308 to the first nut 306 fixed to the port 316, a back surface of the sleeve 302 is pushed in an inner direction of the port 316 by the second nut 308, and the seal member 310 on a tip surface of the sleeve 302 and the pipe 300 are pressed against an innermost surface of the port 316. By this, a fluid connection of the pipe 300 to a flow path 314 can be established with a central axis of a tip portion of the pipe 300 substantially aligned with a central axis of the flow path 314.

Figure 10:
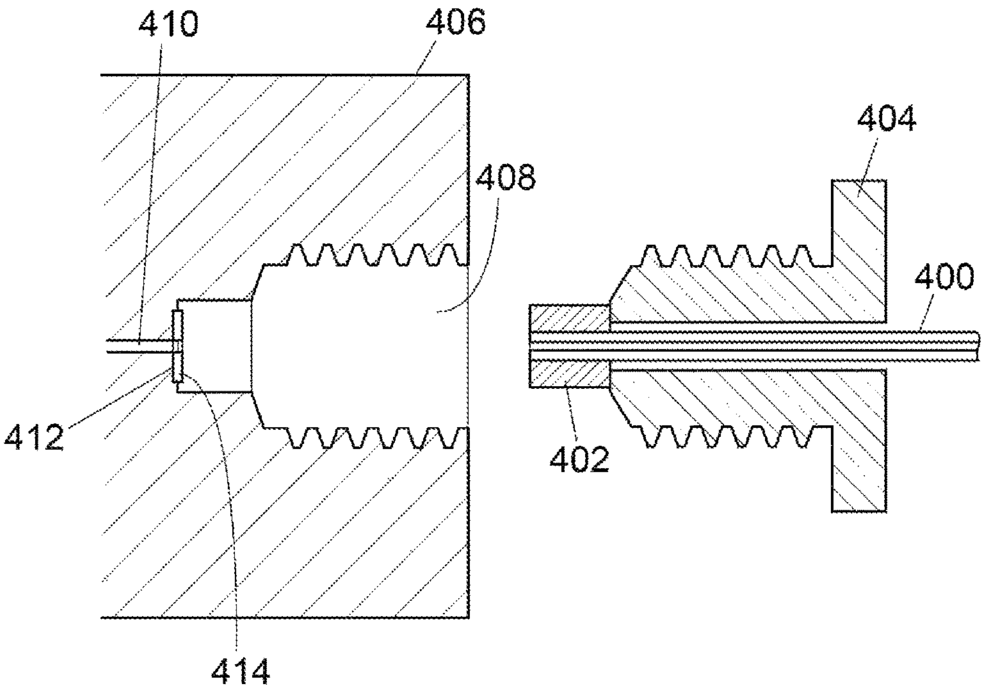
FIG. 10 is a cross-sectional view illustrating a sixth embodiment of the pipe connecting structure.

Next, a sixth embodiment of the pipe connecting structure will be described with reference to FIG. 10.

In this embodiment, a pipe 400 passes through the inside of a nut 404, and a sleeve 402 is attached to a tip portion of the pipe 400. An inner diameter of the nut 404 is smaller than an outer diameter of the sleeve 402. A position of the sleeve 402 is adjusted such that a tip surface is aligned with a tip surface of the pipe 400. A recess 412 having a circular shape is provided on an innermost surface of a port 408 of a flow path block 406, and a seal member 414 having an annular shape made from an elastic material is fitted and held in the recess 412. The seal member 414 only needs to have an elastic modulus smaller than an elastic modulus of a tip surface of the sleeve 402 and the pipe 400.

That is, in this embodiment, the seal member 414 for maintaining liquid-tightness of a connection portion between the pipe 400 and a flow path 410 is held not on a tip surface of the pipe 400 but on an innermost surface of the port 408. By this, since the seal member 414 is held in the port 408 even in a state where the pipe 400 is removed from the port 408, a possibility of damage to the seal member 414 can be reduced as compared with a case where the seal member 414 is held on a tip surface of the pipe 400.

The seal member 414 only needs to have an elastic modulus smaller than an elastic modulus of a tip surface of the pipe 400, a tip surface of the sleeve 402, and a bottom surface of the recess 412 of the port 408. For example, a tip surface of the pipe 400, a tip surface of the sleeve 402, and a bottom surface of the recess 412 of the port 408 can be made from metal or ceramic, and the seal member 412 can be made from resin.

Each of the embodiments described above is merely an example of an embodiment of the pipe connecting structure according to the present invention. The embodiment of the pipe connecting structure according to the present invention is as described below.

A first embodiment of a pipe connecting structure according to the present invention is a pipe connecting structure in which a fluid connection of a pipe to a port is established by insertion of a tip portion of the pipe to a predetermined position in the port, the pipe connecting structure including:

a pressing structure that is in contact with an outer peripheral surface of the tip portion of the pipe inserted to the predetermined position of the port and generates pressing force toward a center of the port on the outer peripheral surface of the tip portion of the pipe, in which the pipe connecting structure is configured so that the center of the tip portion of the pipe and the center of the port substantially coincide with each other by pressing force generated by the pressing structure when the tip portion of the pipe is inserted to the predetermined position of the port.

In the aspect [1] of the first embodiment, the pressing structure includes an elastic member, the elastic member is provided at the tip portion of the pipe, has an outer diameter larger than an inner diameter of the port, and is configured to elastically deform in a radial direction of the pipe following an inner peripheral surface of the port when the tip portion of the pipe is inserted into the port.

In the above aspect [1], a groove may be provided in a circumferential direction on the outer peripheral surface of the tip portion of the pipe, and the elastic member may be attached to the tip portion of the pipe by being fitted into the groove.

In the above case, an example of a material of the elastic member is resin.

In the aspect [2] of the first embodiment, the pressing structure includes an elastic member, the elastic member is provided at the predetermined position in the port, has an inner diameter smaller than an outer diameter of the pipe, and is configured to elastically deform in a radial direction of the port following the outer peripheral surface of the pipe by coming into contact with the outer peripheral surface of the pipe inserted to the predetermined position of the port.

In the above aspect [2], an end surface of the elastic member located on an opening side of the port may have a tapered shape inclined so that an inner diameter decreases toward an inner direction of the port.

Further, in the above aspect [2], a groove may be provided in a circumferential direction on an inner peripheral surface at the predetermined position of the port, and the elastic member may be attached to the predetermined position of the port by being fitted into the groove.

In the above aspect [2], an example of a material of the elastic member is a resin.

In the aspect [3] of the first embodiment, the pressing structure includes a movable wall surface that forms an inner wall at the predetermined position of the port having an inner diameter smaller than an outer diameter of the pipe and is configured to elastically change an inner diameter following an outer peripheral surface of the pipe inserted to the predetermined position.

In the aspect [4] of the embodiment, a tip surface of the pipe is a flat surface, and the pipe connecting structure further includes a seal member having an annular shape made from an elastic material in contact with the tip surface of the pipe in a state where the tip portion of the pipe is inserted to the predetermined position of the port.

In the aspect [5] of the embodiment, the pressing structure includes an inclined surface and an alignment ferrule, the inclined surface is provided at the predetermined position of the port and inclined so that an inner diameter decreases as a distance from an opening of the port increases, the alignment ferrule has an outer peripheral surface provided at the tip portion of the pipe and inclined so as to correspond to the inclined surface at the predetermined position of the port, and the pipe connecting structure is configured so that the outer peripheral surface of the alignment ferrule of the pipe slides along the inclined surface at the predetermined position of the port when the tip portion of the pipe is inserted to an innermost surface side of the port, as a result, the tip portion of the pipe is led to a position in the port at which a center of the tip portion of the pipe and a center of the port substantially coincide with each other.

A second embodiment of the pipe connecting structure according to the present invention is a pipe connecting structure in which a fluid connection of a pipe to a port is established by insertion of a tip portion of the pipe to a predetermined position in the port, and an innermost surface of the port and a tip surface of the pipe are flat surfaces, the pipe connecting structure including:

a seal member having an annular shape made from an elastic material held on the innermost surface of the port, in which the seal member is configured to be sandwiched between the innermost surface of the port and the tip surface of the pipe when the tip portion of the pipe is inserted to the predetermined position of the port, so that a fluid connection is liquid-tightly established between internal flow paths of the pipe and the port.

In the aspect [1] of the second embodiment, a recess having a circular shape is provided in the innermost surface of the port, and the seal member is fitted in the recess.

In the aspect [2] of the second embodiment, an elastic modulus of the seal member is smaller than an elastic modulus of the innermost surface of the port and the tip surface of the pipe.

DESCRIPTION OF REFERENCE SIGNS

100, 200, 300, 400 pipe
102, 202, 302, 402 sleeve
104, 217 groove
106, 218, 218' elastic member
108, 204, 310, 414 seal member
110, 206, 306, 308, 404 nut
114, 210, 236, 316, 408 port
224, 238 movable wall surface
320 alignment ferrule

What is claimed is:

1. A pipe connecting structure in which a fluid connection of a pipe to a port is established by insertion of a tip portion of the pipe to a predetermined position in the port, the pipe connecting structure comprising:

a pressing structure that is in contact with an outer peripheral surface of the tip portion of the pipe inserted to the predetermined position of the port and generates pressing force toward a center of the port on the outer peripheral surface of the tip portion of the pipe, wherein the pipe connecting structure is configured so that a center of the tip portion of the pipe and a center of the port substantially coincide with each other by pressing force generated by the pressing structure when the tip portion of the pipe is inserted to the predetermined position of the port, the pressing structure includes a sleeve and an elastic member extending radially outward from the sleeve, wherein:

the sleeve is provided at the tip portion of the pipe, and the elastic member has an outer diameter larger than an inner diameter of the port, and is configured to elastically deform in a radial direction of the pipe by being compressed in the radial direction by the inner peripheral surface of the port when the tip portion of the pipe is inserted into the port, a tip surface of the pipe is a flat surface, and the pipe connecting structure further includes a seal member having an annular shape made from an elastic material in contact with the tip surface of the pipe in a state where the tip portion of the pipe is inserted to the predetermined position of the port.

2. The pipe connecting structure according to claim 1, wherein a groove is provided in a circumferential direction on the outer peripheral surface of the tip portion of the pipe, and the elastic member is attached to the tip portion of the pipe by being fitted into the groove.

3. The pipe connecting structure according to claim 2, wherein a material of the elastic member is resin.

4. The pipe connecting structure according to claim 1, wherein the sleeve includes a groove located in an outer surface of the sleeve and the elastic member is seated in the groove.

* * * * *